Dec. 23, 1952 W. J. HUGHES 2,622,858
APPARATUS FOR SUBMERGED GAS DIFFUSION
Filed April 22, 1948 2 SHEETS—SHEET 1
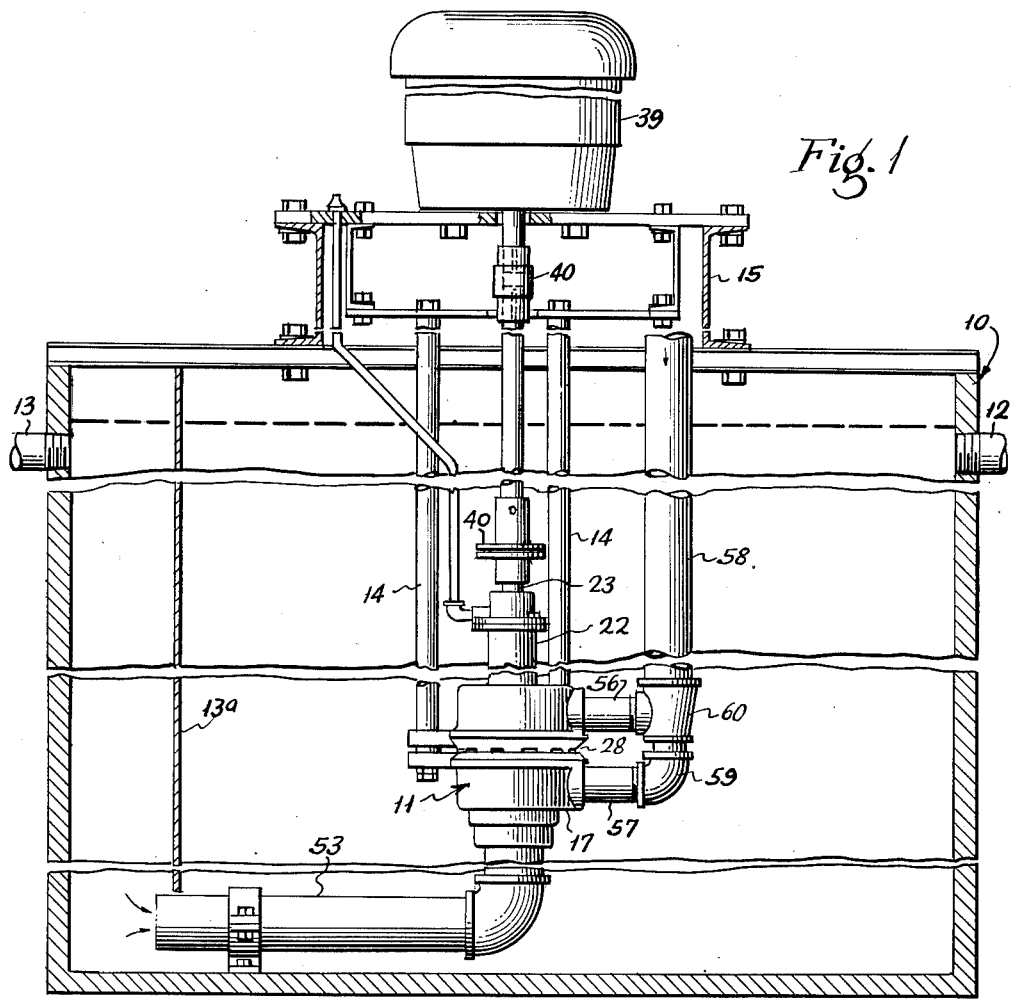
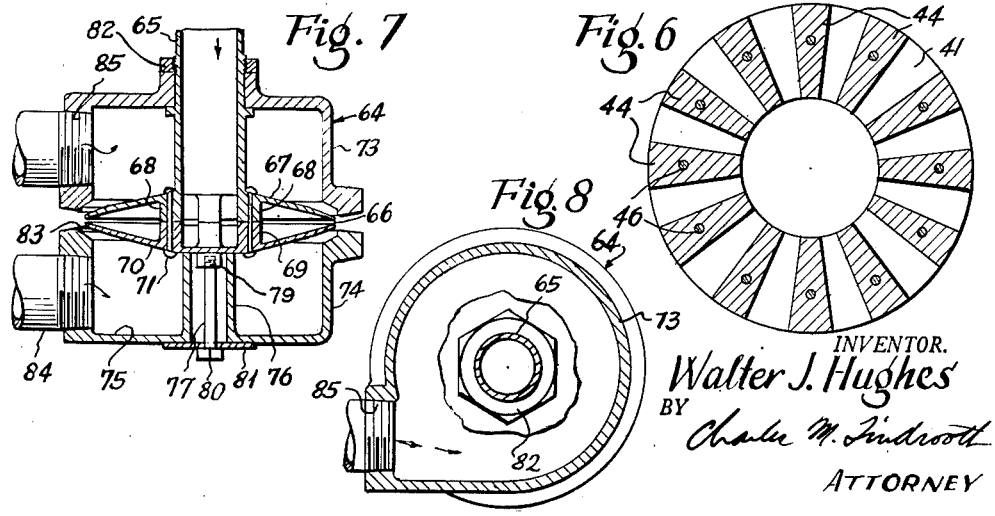
INVENTOR.
Walter J. Hughes
BY
Charles M. Findroth
ATTORNEY

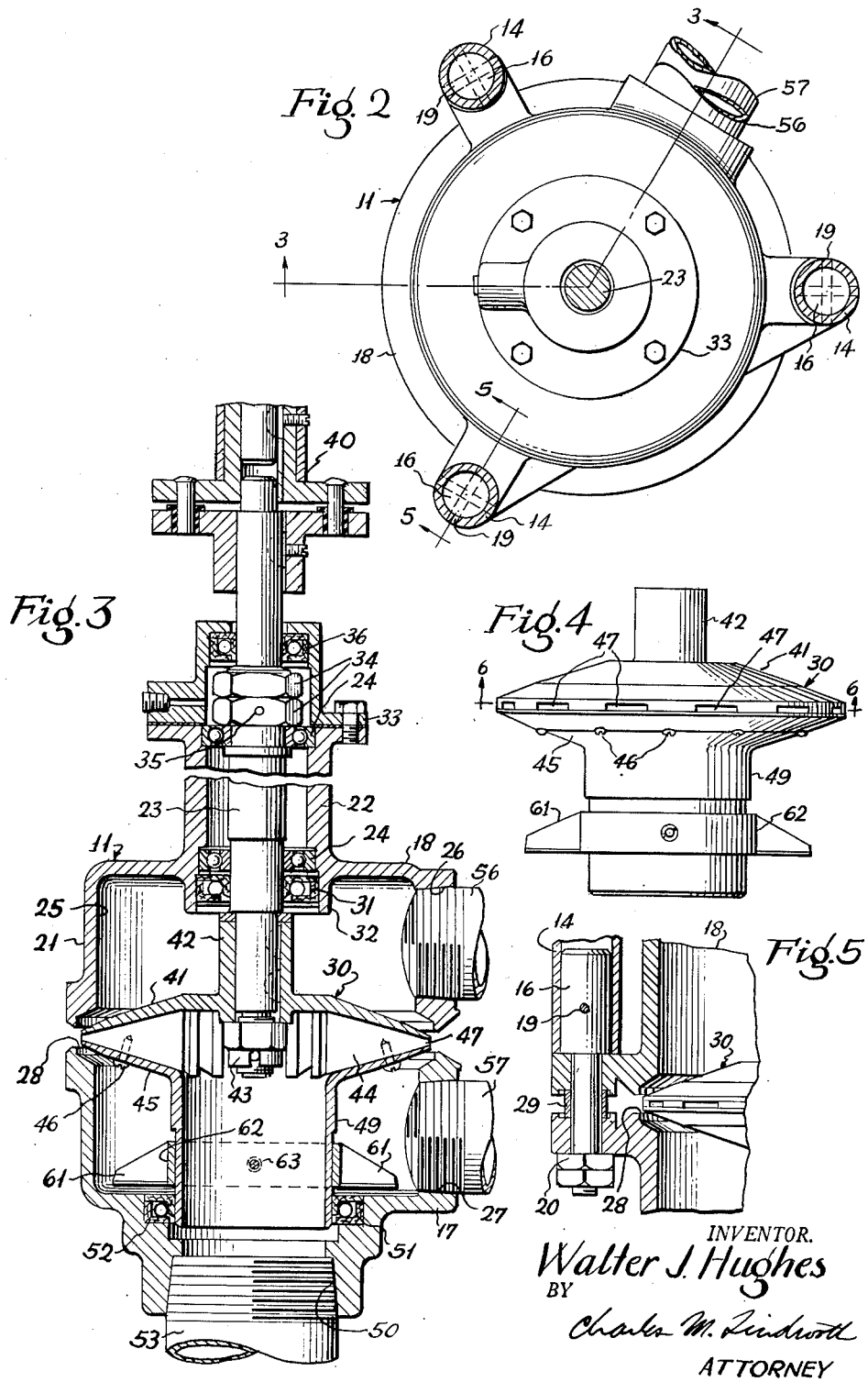

Patented Dec. 23, 1952

2,622,858

UNITED STATES PATENT OFFICE 2,622,858

APPARATUS FOR SUBMERGED GAS DIFFUSION

Walter J. Hughes, Chicago, Ill., assignor to Infilco Incorporated, Chicago, Ill., a corporation of Delaware Application April 22, 1948, Serial No. 22,639

7 Claims. (Cl. 261—77)

This invention relates to improvements in devices for treating liquids by aerating or diffusing gases therein.

The principal objects of my invention are to provide a new and improved liquid treating device of a novel and simple construction for diffusing a gas through a liquid by projecting a thin film of liquid through a gas and into a liquid for treatment thereof, while the device is submerged in a liquid treatment tank.

A further object of my invention is to provide an improved form of liquid treatment device, for aerating or diffusing gas through a liquid by the aspirating effect of a jet of liquid projected through an elongated orifice of a gas chamber.

A more specific object of my invention is to provide a gas diffuser including a power driven rotatable impeller adapted to be submerged in the liquid being treated, but shielded from the liquid, so as to cut down friction and reduce power consumption, and having a peripheral fluid nozzle formed therein forming a rapidly rotating flat nozzle for drawing a thin film of liquid through a gas such as air or carbon dioxide and diffusing the gas in the liquid being treated.

These and other objects of my invention will more clearly appear as the following specification proceeds and with reference to the accompanying drawings wherein:

Figure 1 is a cross-sectional view taken through a liquid treatment tank showing a gas diffuser constructed in accordance with my invention in position therein;

Figure 2 is a plan view of the gas diffuser shown in Figure 1 with certain parts thereof removed;

Figure 3 is a transverse sectional view taken substantially along the line 3—3 of Figure 2;

Figure 4 is a detail view drawn to substantially the same scale as Figure 3 and showing certain details of one form of impeller which may be used in the device of my invention;

Figure 5 is an enlarged detail view showing certain details of the diffuser not shown in Figure 3;

Figure 6 is a horizontal sectional view taken substantially along lines 6—6 of Figure 4 in order to show certain details of construction of the impeller;

Figure 7 is a transverse sectional view showing a modified form in which my invention may be embodied; and Figure 8 is a plan view of the diffuser shown in Figure 7.

In Figure 1 of the drawings a liquid treatment tank 10 is shown as having a gas diffuser 11 positioned therein, and submerged in the liquid being treated. Said liquid treatment tank is herein shown as being of a type used to recarbonate water after lime softening. It should be understood, however, that said liquid treatment tank may be of any other form used to treat liquids by aerating or diffusing a gas therein, and may be a sewage basin and the diffuser may be utilized to aerate sewage by diffusing air through the sewage to be treated, so as to oxidize polluted matter contained in the sewage.

The treatment tank 10 is herein shown as having an inlet 12 for the liquid undergoing treatment and an outlet 13 for the treated liquid, with a baffle 13a extending thereacross, adjacent but spaced from said outlet and extending downwardly along said tank close to its bottom. The diffuser 11 is supported within said tank by means of tubular support members 14, 14, secured to and depending from a supporting structure 15, extending across the top of said tank. Said tubular support members, as herein shown, fit over and are secured at their lower ends to cylindrical heads of bolts 16, 16, which serve to connect a lower part 17 of a casing 18 to the upper part thereof in vertically spaced relation with respect thereto, as will hereinafter more clearly appear as this specification proceeds. Pins 19, 19, extending through said tubular support members and the heads of said bolts, connect said support members to said bolts. Nuts 20, 20, threaded on the lower ends of said bolts serve to connect the upper and lower parts of said casing together.

The upper part of the casing 18 includes an inverted bowl-like lower portion 21 open at its bottom and having a reduced cylindrical portion 22 extending upwardly therefrom and flanged at its upper end. Said cylindrical portion 22 forms a bearing support for a vertical shaft 23, journaled therein on vertically spaced ball bearings 24, 24. Said bowl-like portion 21 of said casing forms the upper half of a gas chamber 25 and has gas inlet 26 leading thereinto. The lower part 17 of said casing opens towards said bowl-like portion 21 and corresponds substantially to the form thereof and forms a lower half of the gas chamber 25 having a gas inlet 27 leading thereinto. The gap between said upper and lower parts of said gas chamber may be regulated to the desired width to form the orifice of a peripheral nozzle 28. As herein shown, spacing collars 29, 29, encircle the bolts 16 and are interposed between said parts of said casing. Said collars may be of the required thickness to form the desired gap between said parts of said casing, and other collars may be interchanged therefor where it is desired to vary the width of the orifice of said nozzle.

A centrifugal runner or impeller 30 is rotatably mounted within the casing 18 in alignment with the peripheral nozzle formed by the gap between the upper and lower parts of said casing. Said impeller is herein shown as being secured to the lower end of the shaft 23, and will hereinafter be more fully described as this specification proceeds.

A seal 31, to keep liquid from the lower ball bearing 24, is mounted beneath said lower ball bearing 24 in an annular portion 32 of the casing 18, herein shown as extending within the gas chamber 25. A flanged cap piece 33 having the vertical shaft 23 extending therethrough, is secured to the upper flanged portion of said casing. Said cap piece encloses retaining nuts 34, 34, threaded on said shaft in position in said casing. A pin 35 extending through said nuts and shaft is provided to retain said nuts in position thereon. A seal 36 is mounted in the upper portion of said cap piece and encircles the shaft 23, to prevent liquid from seeping therethrough. The upper end of the shaft 23 is herein shown as having a motor 39 directly connected therewith, as by coupling means indicated generally by reference character 40.

The impeller 30, as herein shown, includes an upper plate 41 having an inwardly dished portion facing the ground and having a hub 42 extending upwardly therefrom and keyed to the lower end of the shaft 23. A castellated nut 43, threaded on the end of said shaft and suitably locked thereto, is provided to hold said plate in position thereon. The outer bottom edge of said plate is in alignment with the slotted portion of the casing 18, which forms the orifice of the nozzle 28, but is spaced inwardly from and a predetermined distance beneath the upper margins of the orifice of said nozzle. The upper margins of the periphery of said plate are likewise spaced beneath the upper margins of said orifice, for the ejection of gas therethrough. A plurality of spaced impeller blades or vanes 44, 44, depend from the bottom of said plate and conform to the form thereof in vertical section. Said vanes may extend radially along the bottom of said plate as shown in Figures 3 and 6. It should be understood however that they may be of curved form for obtaining particular pumping heads, velocities, capacities, direction of discharge and efficiencies at certain motor speeds.

The bottom sides of the vanes 44, 44, correspond in form to the top sides thereof and are covered by a shroud plate 45 facing the plate 41 and having an upwardly facing dished-in portion corresponding to the form of said plate 41, but disposed in opposite relation with respect thereto, so as to form a chamber therebetween converging at the peripheries of said plates.

The shroud plate 45 is herein shown as being secured to the bottom sides of the vanes 44, 44, by means of machine screws 46, 46, threaded therein. The upper outer edge of said shroud plate is spaced vertically from the lower outer edge of the plate 41 so as to form a plurality of peripheral liquid ejecting nozzles 47, 47, in the spaces between said vanes. The longitudinal center lines of the orifices of said nozzles are in alignment with the longitudinal center line of the orifice of the nozzle 28. The outer edge of said plate 45 is herein shown as being in vertical alignment with the outer edge of the plate 41, and the lower outer edge of said shroud plate 45 is spaced above the lower margins of the orifice of the nozzle 28 so as to form a gap between the bottom margins of said plate and the bottom margins of said orifice, for the ejection of gas therethrough.

The shroud plate 45, as herein shown, has a hollow hub 49 depending therefrom and leading to the chamber formed between the plate 41 and 45. The inside of said hub forms a passageway for the admission of liquid to said chamber and communicates with a liquid inlet 50 leading through the bottom of the lower part 17 of said casing 18.

A seal 51 is mounted in a recess 52 formed in the bottom of the lower part 17 of said casing and encircles the lower end of said hub 49, to prevent the leakage of liquid thereby into said gas chamber during operation of said diffuser. The inlet 50 may open directly to the bottom of the treatment tank 10 or may have a pipe 53 connected thereto and extending therefrom and opening on the outlet side of the baffle 13a, for supplying treated liquid free from entrained gas or air to the suction side of the impeller 30.

Pipes 56 and 57 are threaded within the gas inlets 26 and 27 respectively, and extend laterally therefrom and are conected to a gas inlet pipe 58 by means of suitable piping connections such as an L 59 on the end of the pipe 57 and a reducing T 60 threaded on the end of the pipe 56 and connected to said L. Said gas inlet pipe 58 may open above the top of the treatment tank for drawing air therein upon operation of the impeller 30, or may be connected with a source of supply of carbon dioxide or any other gas it is desired to diffuse through the liquid.

Slinger blades 61, 61, extend in opposite directions from an annular ring 62, secured to the lower end of the hollow hub 49 of the shroud plate 45 adjacent the bottom of the gas chamber 25, as by pins 63, 63. Said slinger blades rotate adjacent the bottom of said gas chamber with the impeller 30 and serve to scavenge liquid, which may accumulate in the gas chamber 25 when the device is idle, from the lower side of said gas chamber, so that gas passing to said lower side of said chamber will not be blocked by any liquid which might lie in the lower part of the chamber and the gas inlet 27, and cut off part of the gas passage area.

In operation of the device, the motor 39 is started to rotatably drive the shaft 23 and impeller 30. The liquid in the treatment tank entering the suction inlet of said impeller through the hollow inside of the hub 49 of the shroud plate 45 will be ejected through the nozzles 47, 47, between the impeller vanes 44, 44, by the centrifugal force created by said impeller. This will eject a thin film of liquid through the peripheral orifice of the nozzle 28. Since the orifices of said nozzles 47, 47, are in alignment with and spaced inwardly from and are of lesser width than the width of the orifice of the peripheral nozzle 28, thin films of liquid ejected from said nozzles 47, 47, will pass through the nozzle 28 under pressure and draw gas from the chamber 25 on opposite sides of said film of liquid for ejection into the liquid being treated.

It should herein be noted that the orifice formed by the gap between the upper and lower halves of the casing 18 is of a definite form, with an outwardly flared mouth, to eliminate resistance to the outwardly flowing gas and the liquid ejected therethrough.

It may be seen from the foregoing that I have provided a centrifugal runner or impeller of a closed type, which is like the impeller of a centrifugal pump, and that I turn this impeller in a chamber filled with gas or air instead of liquid. Thus instead of collecting the liquid in a casing from which it is discharged at a high velocity, the liquid discharged from the impeller passes at a high velocity through gas in a chamber and through a slot or nozzle leading from the chamber. The low or negative pressure created by the high jet velocity of the liquid, thus aspirates the gas from the gas chamber.

It may further be seen that since the impeller vanes are shrouded, and since the shrouds are in contact with air or gas instead of liquid, that the impeller is free from the skin friction that would otherwise be set up if the impeller were rotating in liquid. This results in a considerable saving in power for driving the impeller, over the power which would be required to rotate an impeller in liquid, or in a liquid filled pressure chamber.

It should also be noted that while I have herein shown the impeller 39 as ejecting liquid through the nozzle 28 in the form of a thin film and as diffusing gas into the liquid being treated on opposite sides thereof, if desired, and where necessary to eject the liquid and gas at a higher pressure than could be obtained from rotation of an impeller, the liquid inlet 53 may be connected to any suitable source of liquid under pressure, not shown.

In the modified form of my invention shown in Figures 7 and 8, an aspirating or gas diffusing device is shown, in which the liquid ejecting nozzle is stationary, and in which liquid under pressure is supplied thereto from an external source of pressure. As herein shown, a horizontally split casing 64 is supported on the lower end of a tube 65, which extends therein. The lower end of said tube within said casing is flared outwardly and inclined downwardly, and the flared portion thereof forms a dished shroud plate 67. A plurality of lugs 68, 68, depend from said shroud plate, adjacent the central portion thereof, and are adapted to be abutted by lugs 69, 69, extending upwardly from an inwardly dished plate 70, having its dished-in surface facing the dished-in surface of said shroud plate. Suitable fastening means, such as rivets 71, 71, extend through said lugs and plates to secure said plates together in spaced apart relation with respect to each other, so as to form at the outer edges of said plates, the orifice of a peripheral liquid ejecting nozzle 66. The tube 65 may be connected to any suitable source of liquid under pressure, not shown, and discharges to the space between the plates 67 and 70, whereby liquid under pressure is supplied to the ejecting nozzle 66.

The casing 64 includes an upper half 73 mounted on the tube 65 and a complementary lower half 74 spaced vertically therefrom. The insides of said halves of said casing form a gas chamber 75 extending on opposite sides of the peripheral liquid ejecting nozzle 66. The lower half 74 of said casing has a hollow lug 76 extending upwardly from the bottom and herein shown as being formed integrally therewith. The upper side of said lug abuts the bottom of the lower plate 70 of the liquid ejecting nozzle 66. A rod 77 extends through the center of said lug and is threaded at its upper end in a lug 79, depending from said plate. A nut 80 threaded on the lower end of said rod and a washer 81 abutting the bottom of said lower half of said casing serve to secure said lower half of said casing to the lower plate 70.

The upper half 73 of the casing 64 is herein shown as abutting a shouldered portion of the tube 65 and as being held thereto by a nut 82. The gap between the upper and lower halves of said casing is in alignment with the peripheral liquid ejecting nozzle 66 and forms the orifice of a gas diffusing nozzle 83.

Gas inlets 84, and 85, are provided in the upper and lower halves of said casing respectively, for admitting gas within the chamber 75. Said inlets enter said casing along the inner periphery thereof so gas will enter said casing tangentially thereof and cause a whirling movement of liquid lying in the lower half of said chamber upon starting the diffuser, to scavenge this liquid from said chamber.

Where it is desired to aerate sewage, a plurality of diffusers of the form shown in Figure 7 may be provided in the treatment tank or basin at spaced intervals, so to completely aerate the sewage and give it the desired rolling action. Also the gap forming the nozzle 83 may be partially closed, where it may be desirable to direct the air in a particular direction. This is particularly advantageous in aerating sewage, where it may be desired to place the nozzles along the wall of the sewage basin and to diffuse the gas and liquid away from the wall into the basin.

It may also be understood that while the casing 67 is herein shown as being of a substantially cylindrical formation, that said casing may be of any other desired formation, and may be rectangular with a linear slot or diffusing nozzle provided therein, if desired.

While I have herein shown and described several forms in which my invention may be embodied, it will be understood that the construction and arrangement of the various parts may be altered without departing from the spirit and scope thereof. Furthermore, I do not wish to be construed as limiting my invention to the specific embodiments illustrated, excepting as may be limited by the appended claims.

I claim:

1. In an apparatus for diffusing gas in a liquid in a treatment tank, a casing mounted in said tank below the normal operative liquid level therein, the inside of which casing forms a gas chamber, said casing having a slotted portion opening from its periphery and forming a peripheral gas diffusing orifice, a liquid ejector mounted within said gas chamber and comprising a plate, vanes extending radially from one side of said plate, and a shroud plate covering the sides of said vanes opposite from said first mentioned plate, said vanes spacing said plates apart at their outer edges, so as to form a plurality of flat liquid ejecting nozzles opening from the peripheries of said plates, said shroud plate having a central hollow portion extending therefrom, the inside of which forms a liquid passageway for the admission of liquid to the space between said plates for ejection through the spaces between said vanes, said liquid ejecting nozzles and said gas diffusing orifice being in alignment with each other, and a pair of inlets for gas under pressure discharging into said casing on opposite sides of said liquid ejector above and below said plates, respectively, the vertical extension of said liquid ejector being a minor portion only of the vertical extension of said gas chamber, whereby a substantial body of gas is provided above and below said ejector, respectively, for aspiration of gas from both sides by the liquid ejected through said liquid ejecting nozzles.

2. A gas diffuser for diffusing gas into liquid in a tank, said diffuser including a gas chamber mounted, when installed in operative position, in said tank below the normal operative liquid level therein, a centrifugal impeller rotatably mounted in said gas chamber at a central elevation thereof, said impeller including a plate having a dished-in central portion, a dished-in shroud plate facing said first mentioned plate, and secured thereto in spaced apart relation with respect thereto, said plates forming a rotatable flat liquid ejecting nozzle, means for admitting liquid from said tank to the suction side of said impeller, a motor for rotatably driving said impeller, said gas chamber having a peripheral slotted portion forming a gas diffusing nozzle in alignment with said liquid nozzle, and a pair of gas inlet conduits discharging into said gas chamber below and above said impeller, respectively.

3. Apparatus for diffusing gas into a liquid in a tank comprising a casing mounted in said tank at an elevation below the normal liquid level therein, a centrifugal impeller rotatably mounted in a vertically central portion of said casing and including a plate having a plurality of impelling vanes extending from one face thereof, a shroud plate covering the sides of said vanes opposite from said first mentioned plate, said vanes spacing said plates apart, the spaces between said vanes forming passageways leading from the central portion of said plates to the peripheries thereof, to form a plurality of flat liquid ejecting nozzles, a liquid conduit for supplying liquid from said tank to the suction side of said impeller, a motor for rotatably driving said impeller, the inside of said casing forming a gas chamber having considerable vertical extension above and below said vertically central portion and providing gas holding spaces above and below said impeller, respectively, permitting substantially friction free rotation of said impeller in a body of gas, a pair of gas inlets into the portions of said gas chamber above and below said impeller, respectively, said casing having a peripheral slotted portion forming an orifice aligned with said liquid ejecting nozzles.

4. In combination with a liquid treatment tank, a gas diffuser including a casing mounted within said tank beneath the level of the liquid therein, said casing having a slotted portion extending around the periphery thereof and forming the orifice of a peripheral gas diffusing nozzle leading from said casing, a shaft extending downwardly within said casing and journaled therein, an impeller within said casing and secured to said shaft for rotation therewith, a motor for driving said shaft, said impeller including a plate secured to said shaft and having an inwardly dished lower surface, a plurality of spaced impelling vanes secured to said inwardly dished surface of said plate and depending therefrom, a shroud plate covering the lower sides of said vanes and spaced at its periphery from the periphery of said first mentioned plate, to provide a plurality of nozzles opening from the peripheries of said plates and arranged to direct liquid through said gas diffusing nozzle, said shroud plate having a depending hollow portion leading through the bottom of said casing, the inside of which forms an inlet for supplying liquid from said treatment tank to the suction side of said impeller, and gas inlets discharging into said casing above and below said impeller, respectively.

5. In combination with a liquid treatment tank, a gas diffuser including a gas chamber mounted within said tank beneath the level of the liquid therein, a shaft extending downwardly within said gas chamber and journaled therein, an impeller within said gas chamber and secured to said shaft for rotation therewith, a motor for driving said shaft, said gas chamber having a slotted portion extending around the periphery thereof and forming the orifice of a peripheral gas diffusing nozzle, a gas inlet to said gas chamber, said impeller including a plate secured to said shaft and having an inwardly dished lower surface, a plurality of impelling vanes secured to said inwardly dished surface and depending therefrom, a shroud plate covering the lower sides of said vanes and spaced at its periphery from the periphery of said first mentioned plate, to provide a plurality of flat liquid ejecting nozzles opening to said slotted portion of said gas chamber, said shroud plate having a depending hollow portion leading through the bottom of said gas chamber and forming an inlet for liquid from said treatment tank to the suction side of said impeller, and means for scavenging liquid from said gas chamber upon initially starting said diffuser, comprising a slinger blade adjacent the bottom of said gas chamber, said slinger blade being secured to, and rotatable with, said hollow portion of said shroud plate.

6. In an apparatus for diffusing gas in a liquid in a tank, a gas chamber mounted in said tank below the normal operative liquid level therein, said gas chamber having an upper portion and a lower portion spaced from one another to form a peripheral orifice intermediate said upper and lower portions, a gas inlet conduit discharging into said upper portion, a second gas inlet conduit discharging into said lower portion, a liquid ejector disposed within said gas chamber at a central elevation thereof intermediate said gas inlets, said ejector having a peripheral slotted portion in alignment with the orifice of said gas chamber, liquid inlet means to the central portion of said ejector, a plurality of vanes extending about said central portion and to said peripheral slotted portion to form liquid ejecting nozzles, the vertical extension of said liquid ejector being only a minor portion of the height of said gas chamber to provide above and below said ejector, respectively, a substantial body of gas to be aspirated from both sides by the jets of liquid ejected through said nozzles.

7. Apparatus for diffusing gas into liquid in a treatment tank, including a gas chamber mounted within said tank below the normal liquid level therein, a gas inlet conduit discharging to the upper portion of said gas chamber, a second gas inlet conduit discharging to the lower portion of said gas chamber, said gas chamber having a substantially cylindrical vertical wall and having an elongated slotted portion opening therefrom at a central elevation of said wall and forming a peripheral orifice intermediate said upper and lower portions, a liquid ejector within said gas chamber having an orifice of less width than the width of the orifice of said gas chamber, and inlet means for supplying liquid under pressure to said liquid ejector, said liquid ejector being mounted with its orifice in alignment with the orifice of said gas chamber, the vertical extension of said ejector being only a minor portion of the vertical extension of said gas chamber to provide a substantial body of gas above and below said ejector, respectively, whereby a jet of liquid under pressure discharged from said liquid ejector and passing through the orifice of said gas chamber will aspirate substantial amounts of gas from both sides of said jet.

WALTER J. HUGHES.

REFERENCES CITED

The following references are of record in the file of this patent:

UNITED STATES PATENTS

| Number | Name | Date |
|---|---|---|
| 864,811 | Thoens | Sept. 3, 1907 |
| 901,450 | Keller | Oct. 20, 1908 |
| 1,242,445 | Ittner | Oct. 9, 1917 |
| 1,936,308 | Mueller | Nov. 21, 1933 |
| 2,126,164 | Anderson | Aug. 9, 1938 |
| 2,393,976 | Daman | Feb. 5, 1946 |
| 2,447,123 | Jones | Aug. 17, 1948 |